(12) United States Patent
Jiang et al.

(10) Patent No.: US 8,670,525 B2
(45) Date of Patent: *Mar. 11, 2014

(54) AUTOMATED DSL PERFORMANCE ADJUSTMENT

(71) Applicant: AT&T Intellectual Property I, L.P., Atlanta, GA (US)

(72) Inventors: Baofeng Frank Jiang, Pleasanton, CA (US); Xidong Wu, San Ramon, CA (US); Jim Tidashi Otsuka, San Jose, CA (US); John Porter Van Slyke, Lafayette, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/800,449

(22) Filed: Mar. 13, 2013

(65) Prior Publication Data

US 2013/0195256 A1 Aug. 1, 2013

Related U.S. Application Data

(63) Continuation of application No. 13/035,283, filed on Feb. 25, 2011, now Pat. No. 8,451,978, which is a continuation of application No. 11/890,995, filed on Aug. 7, 2007, now Pat. No. 7,920,677, which is a continuation of application No. 10/761,123, filed on Jan. 20, 2004, now Pat. No. 7,272,209.

(51) Int. Cl.
| | |
|---|---|
| *H04M 1/24* | (2006.01) |
| *H04M 3/08* | (2006.01) |
| *H04M 3/22* | (2006.01) |

(52) U.S. Cl.
USPC ......... 379/1.04; 379/1.03; 379/24; 379/29.09

(58) Field of Classification Search
USPC .............. 379/1.01, 1.03, 1.04, 22, 24, 26.01, 379/27.04, 28, 29.09
See application file for complete search history.

(56) References Cited

U.S. PATENT DOCUMENTS

| | | | |
|---|---|---|---|
| 5,751,338 A | 5/1998 | Ludwig | |
| 5,974,139 A | 10/1999 | McNamara | |

(Continued)

FOREIGN PATENT DOCUMENTS

| | | |
|---|---|---|
| WO | 0205529 A1 | 1/2002 |
| WO | 2005072102 A2 | 8/2005 |

OTHER PUBLICATIONS

"International Search Report and Written Opinion", The International Searching Authority for International Application No. PCT/US04/42840, mailed on Mar. 7, 2007.

(Continued)

*Primary Examiner* — Quoc D Tran
(74) *Attorney, Agent, or Firm* — Toler Law Group, PC

(57) ABSTRACT

A method includes identifying one or more second digital subscriber lines from one or more first digital subscriber lines based on historical performance data. The one or more second digital subscriber lines are identified based on degraded performance that is determined using first performance information for the one or more first digital subscriber lines. The method includes applying a line profile to the one or more second digital subscriber lines. The method includes storing second performance information associated with the one or more second digital subscriber lines. The method includes sending information to a remote computing device.

20 Claims, 3 Drawing Sheets

(56) References Cited

U.S. PATENT DOCUMENTS

| | | |
|---|---|---|
| 5,987,061 A | 11/1999 | Chen |
| 6,044,107 A | 3/2000 | Gatherer et al. |
| 6,055,268 A | 4/2000 | Timm et al. |
| 6,081,291 A | 6/2000 | Ludwig |
| 6,292,559 B1 | 9/2001 | Gaikwad |
| 6,317,495 B1 | 11/2001 | Gaikwad |
| 6,424,657 B1 | 7/2002 | Voit |
| 6,466,088 B1 | 10/2002 | Rezvani |
| 6,467,092 B1 | 10/2002 | Geile |
| 6,477,238 B1 | 11/2002 | Schneider |
| 6,498,791 B2 | 12/2002 | Picket |
| 6,507,606 B2 | 1/2003 | Shenoi |
| 6,532,277 B2 | 3/2003 | Ulanskas |
| 6,538,451 B1 | 3/2003 | Galli |
| 6,549,568 B1 | 4/2003 | Bingel |
| 6,570,855 B1 | 5/2003 | Kung |
| 6,597,689 B1 | 7/2003 | Chiu |
| 6,608,835 B2 | 8/2003 | Geile |
| 6,614,781 B1 | 9/2003 | Elliott et al. |
| 6,625,255 B1 | 9/2003 | Green |
| 6,640,239 B1 | 10/2003 | Gidwani |
| 6,643,266 B1 | 11/2003 | Pugaczewski |
| 6,658,052 B2 | 12/2003 | Krinsky |
| 6,667,971 B1 | 12/2003 | Modarressi |
| 6,668,041 B2 | 12/2003 | Kamali |
| 6,674,725 B2 | 1/2004 | Nabkel |
| 6,674,749 B1 | 1/2004 | Mattathil |
| 6,680,940 B1 | 1/2004 | Lewin |
| 6,697,768 B2 | 2/2004 | Jones |
| 6,700,927 B1 | 3/2004 | Esliger |
| 6,724,859 B1 | 4/2004 | Galli |
| 6,728,238 B1 | 4/2004 | Long |
| 6,731,678 B1 | 5/2004 | White |
| 6,735,601 B1 | 5/2004 | Subrahmanyam |
| 6,751,218 B1 | 6/2004 | Hagirahim |
| 6,751,315 B1 | 6/2004 | Liu |
| 6,751,662 B1 | 6/2004 | Natarajan |
| 6,754,283 B1 | 6/2004 | Li |
| 6,762,992 B1 | 7/2004 | Lemieux |
| 6,763,025 B2 | 7/2004 | Leatherbury |
| 6,765,864 B1 | 7/2004 | Natarajan |
| 6,765,918 B1 | 7/2004 | Dixon |
| 6,769,000 B1 | 7/2004 | Akhtar |
| 6,769,024 B1 | 7/2004 | Natarajan |
| 6,771,673 B1 | 8/2004 | Baum |
| 6,775,232 B1 | 8/2004 | Ah Sue |
| 6,775,267 B1 | 8/2004 | Kung |
| 6,775,268 B1 | 8/2004 | Wang |
| 6,775,273 B1 | 8/2004 | Kung |
| 6,778,525 B1 | 8/2004 | Baum et al. |
| 6,782,082 B2 | 8/2004 | Rahamim |
| 6,819,746 B1 | 11/2004 | Schneider |
| 6,914,961 B2 | 7/2005 | Holeva |
| 6,985,444 B1 | 1/2006 | Rosen |
| 7,106,833 B2 | 9/2006 | Kerpez |
| 7,162,011 B2 | 1/2007 | Kolligs |
| 7,272,209 B2 | 9/2007 | Jiang et al. |
| 7,920,677 B2 | 4/2011 | Jiang et al. |
| 8,451,978 B2 * | 5/2013 | Jiang et al. .......... 379/1.04 |
| 2002/0057763 A1 | 5/2002 | Sisk |
| 2004/0095921 A1 | 5/2004 | Kerpez |
| 2005/0141673 A1 | 6/2005 | Lunt |
| 2007/0274458 A1 | 11/2007 | Jiang |

OTHER PUBLICATIONS

"International Telecommunication Union, "Series G: Transmission Systems and Media Digital Systems and Networks. Digital Sections and Digital Line System-Access Networks", Asymmetric Digital Subscriber Line (ADSL) Transceivers-2(ADSL2)," G.992.3, ITU-T; Jul. 2002; pp. 21-27.

"Non-Final Office Action for U.S. Appl. No. 10/761,123", United States Patent and Trademark Office (USPTO), mailed Feb. 9, 2007, 11 pages.

"Notice of Allowance and Fee(s) Due for U.S. Appl. No. 10/761,123", United States Patent and Trademark Office (USPTO), mailed Jul. 12, 2007; 4 pages.

"Notice of Allowance and Fee(s) Due for U.S. Appl. No. 11/890,995", United States Patent and Trademark Office (USPTO), mailed Dec. 14, 2010; 6 pages.

"Notice of Allowance and Fee(s) Due for U.S. Appl. No. 13/035,283", United States Patent and Trademark Office (USPTO); mailed Dec. 17, 2012; 12 pages.

"Office Action (Ex Parte Quayle) for U.S. Appl. 11/890,995", United States Patent and Trademark Office (USPTO), mailed Aug. 26, 2010; 14 pages.

"Office Action (Ex Parte Quayle) for U.S. Appl. No. 13/035,283", United States and Trademark Office (USPTO); mailed Sep. 21, 2012; 18 pages.

\* cited by examiner

US 8,670,525 B2

AUTOMATED DSL PERFORMANCE ADJUSTMENT

PRIORITY CLAIM

The present application is a continuation of and claims priority from U.S. patent application Ser. No. 13/035,283 filed on Feb. 25, 2011 and entitled "AUTOMATED DSL PERFORMANCE ADJUSTMENT", which is a continuation of and claims priority from U.S. patent application Ser. No. 11/890,995 filed on Aug. 7, 2007, now issued as U.S. Pat. No. 7,920,677, and entitled "AUTOMATED DSL PERFORMANCE ADJUSTMENT", which is a continuation of and claims priority from U.S. patent application Ser. No. 10/761,123 filed on Jan. 20, 2004, now issued as U.S. Pat. No. 7,272,209, and entitled "AUTOMATED DSL PERFORMANCE ADJUSTMENT". The contents of U.S. patent application Ser. No. 13/035,283, U.S. patent application Ser. No. 11/890,995, and U.S. patent application Ser. No. 10/761,123 are expressly incorporated herein by reference in their entirety.

FIELD OF THE DISCLOSURE

The present disclosure relates generally to an automated method of adjusting digital subscriber line (DSL) performance and an automated DSL performance control system.

BACKGROUND

Digital subscriber lines (DSL), such as ADSL lines, are configured to particular profiles based on service agreement, loop quality, and operating environment. A change in these factors, such as introduction of outside electro-magnetic noise, degrades line performance. If the degradation is serious, the line may become a "problem line" and need a new profile. With a large network, there may be thousands of DSL lines that become problem lines. The typical system to make profile adjustments is to have a service technician manually change the DSL line profile in response to customer complaints received at a volume call center. This process may involve one or more truck rolls (sending a service technician to a customer site) which leads to increased DSL maintenance and service costs. It would be desirable to reduce the costs associated with DSL line maintenance while providing improved DSL line performance.

DETAILED DESCRIPTION

In a particular embodiment, the present application discloses an automated digital subscriber line performance control system comprising a computer system including a logic module to evaluate performance of a plurality of DSL lines and to automatically select a set of DSL lines from the plurality of DSL lines, a line profile database responsive to the computer system, the line profile database providing a plurality of line profiles in response to a request from the computer system, and a digital subscriber line access multiplexer coupled to the computer system. The digital subscriber line access multiplexer is configured to measure a performance parameter of a plurality of physical DSL lines and to change a profile for at least one of the plurality of DSL lines. The set of DSL lines has degraded performance characteristics based on historical performance data.

In another embodiment, an automated method of adjusting digital subscriber line (DSL) performance is disclosed. The method includes evaluating performance of a plurality of DSL lines; automatically selecting a set of DSL lines from the plurality of DSL lines, the set of DSL lines having degraded performance characteristics based on historical performance data measuring a performance parameter for each of the set of DSL lines; removing from the set of DSL lines any DSL lines that have suitable performance based on the measured performance parameter to create a revised set of DSL lines with degraded performance; and applying one of a plurality of line profiles to each of the physical DSL lines identified by the revised set of DSL lines.

Figure 1:
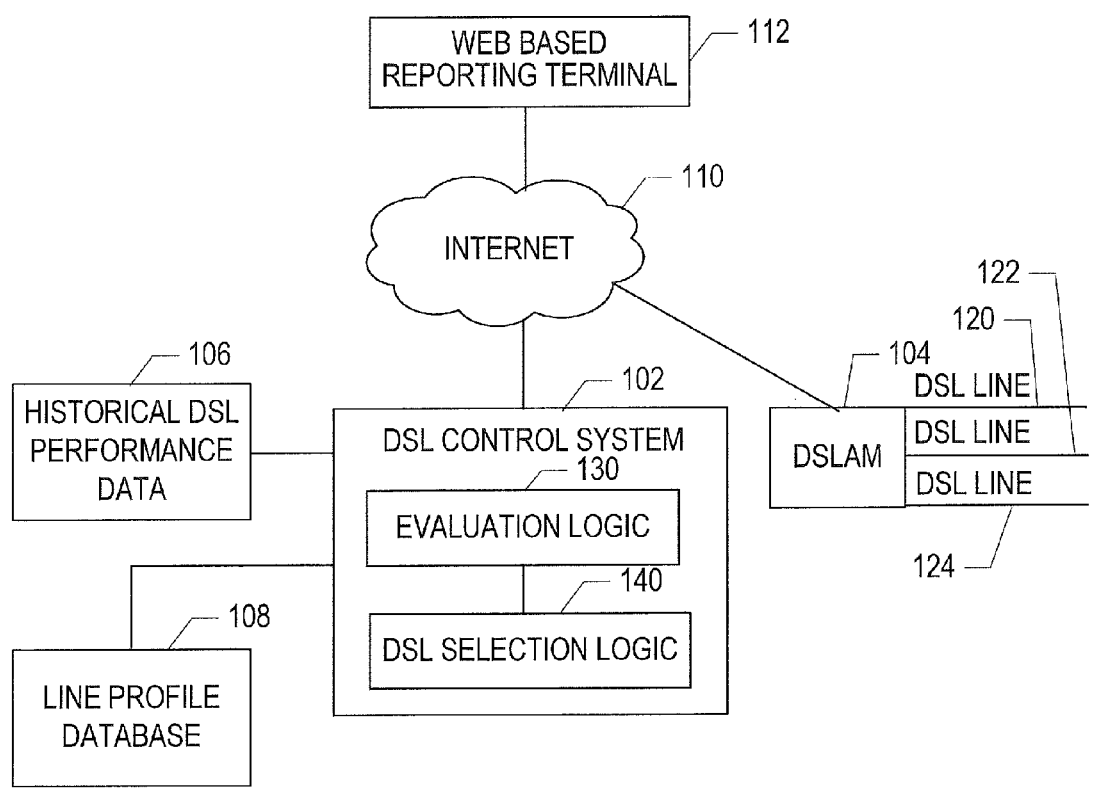
FIG. 1 is a block diagram of a DSL network and a DSL control system.

Referring to FIG. 1, a system in accordance with an embodiment of the present disclosure is illustrated. The system includes a digital subscriber line (DSL) control system 102, an internet network core 110, and a digital subscriber line access multiplexor (DSLAM) 104. The system also includes a line profile database 108 and a historical DSL performance database 106 coupled to the DSL control system 102. In addition, the system includes a remote web-based reporting terminal 112 coupled to the internet 110. The DSLAM 104 is connected to the internet 110 and connects to a plurality of DSL lines 120 such as illustrated DSL lines 120, 122, and 124. The DSL control system 102 includes evaluation logic 130 and DSL line selection logic 140.

The DSL control system 102 may be implemented as a computer system that includes software to execute the evaluation logic 130 and the DSL selection logic 140. The web-based reporting terminal 112 may be a computer workstation, or personal computer with a display device that includes an input device and a computer processor. An example is a computer workstation that may be operated by a user for viewing reports as to DSL network performance and statistics. The DSL performance database 106 and the line profile database 108 may be implemented with standard computer database technology.

Figure 2:
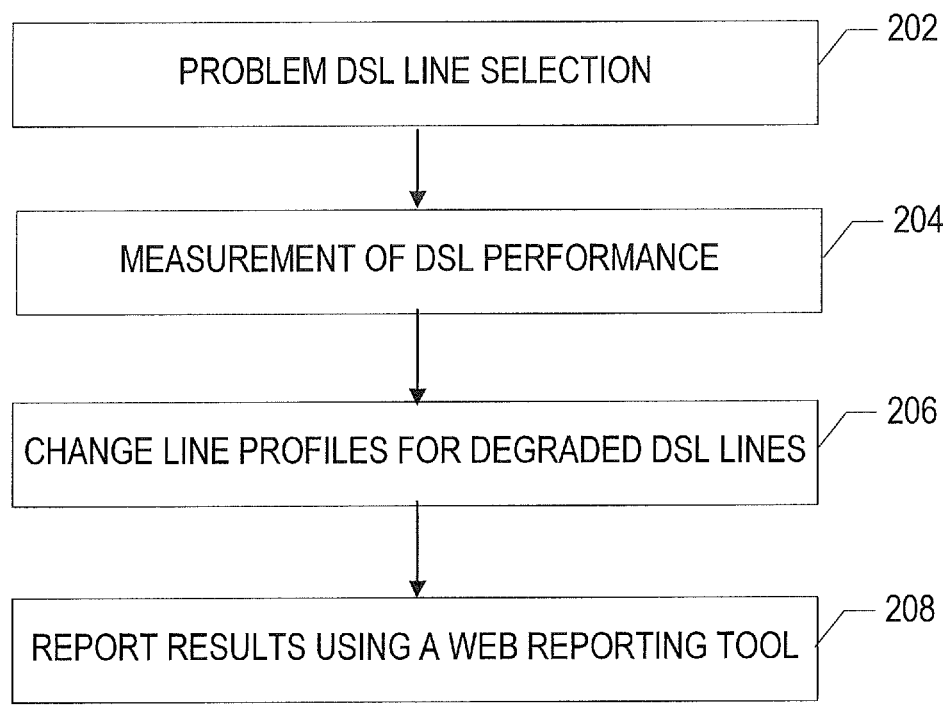
FIG. 2 is a flowchart of an illustrative method of adjusting DSL line performance.

Referring to FIG. 2, operation of the system illustrated in FIG. 1 is described. At step 202, a problem DSL line selection is made. For example, historical DSL performance data for various DSL lines supported by the DSLAM 104 may be evaluated to determine those DSL lines that have reduced performance or performance below a defined performance threshold. In this manner, one or more problem DSL lines may be selected. Selection logic to determine and evaluate the historical DSL performance data may be performed, such as by using the DSL selection logic unit 104 within the DSL control system 102. DSL performance for various lines is measured, at step 204. This step may be performed on all DSL lines or may be performed just on the reduced set of DSL lines that are identified as problem lines. The measurement of DSL performance made on selected problem lines is performed to confirm that the problem DSL line status through an additional measurement.

Line profiles for the degraded DSL lines are changed, at step 206. For example, the DSL lines that were initially selected, at step 202, and then verified as having performance problems at step 204, would have their line profiles changed, at step 206. An example of a changed line profile includes a change to a reduced speed profile or to a channel interleaved profile to assist the performance of the problem DSL line selected. A report of the results of problem DSL lines is provided using a web-reporting tool, at 208. For example, a performance measurement of the DSL line may be taken after the profile has been changed. The performance of selected problem DSL lines may be reported both before and after the profile change. A display report may be reported to an operator, such as via the remote web-based reporting terminal 112. In this matter, an operator of a network may observe performance measurements for problem DSL lines and may observe and evaluate those problem DSL lines before and after a change of profile has been made.

Figure 3:
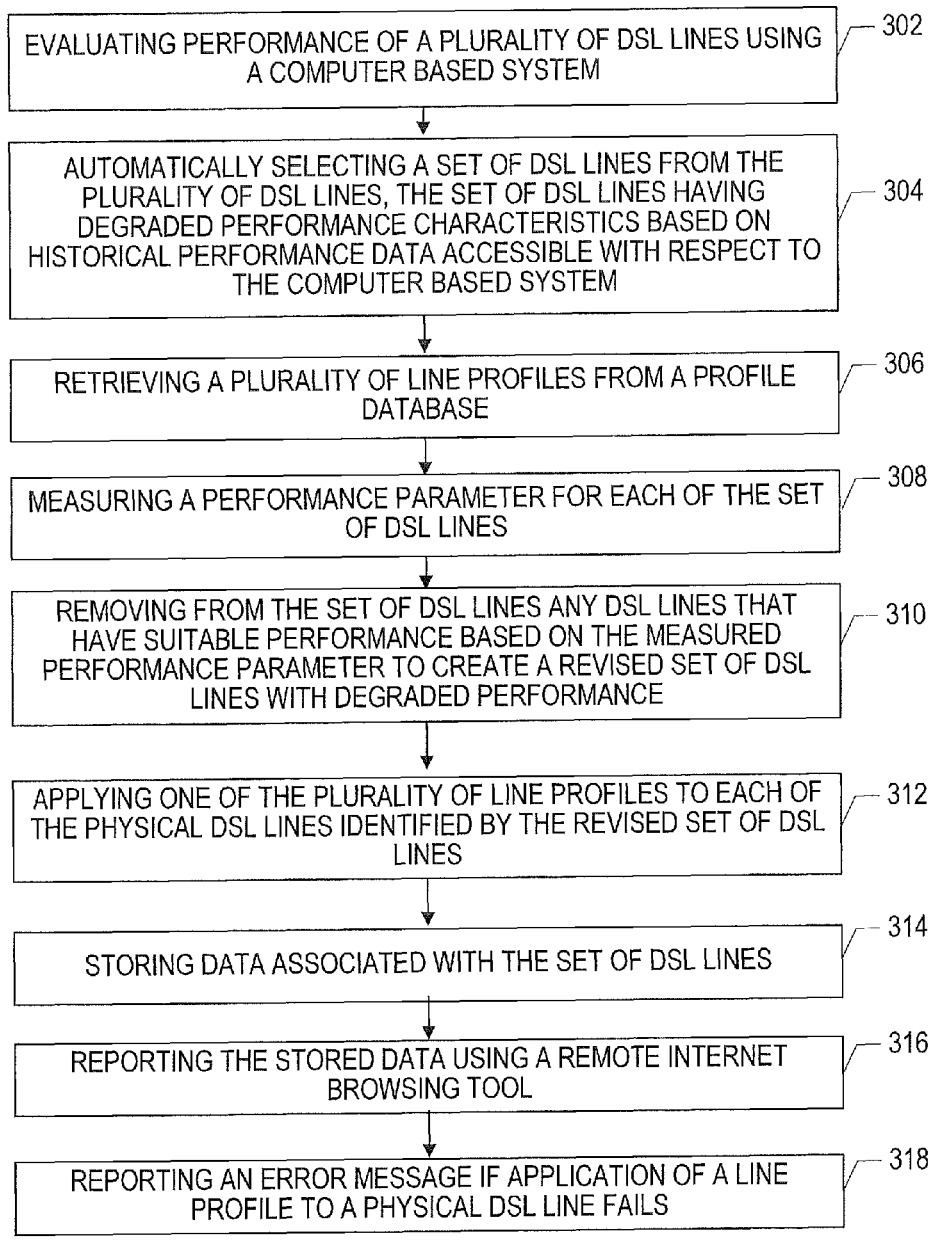
FIG. 3 is a flowchart of a detailed method of adjusting DSL line profiles.

Referring to FIG. 3, a further detailed flow chart that illustrates operation of the system of FIG. 1 is shown. Performance of the plurality of DSL lines is evaluated using a computer-based system, at step 302. An example of such a computer-based system would be the DSL control system 102. The set of DSL lines is automatically selected from a plurality of available DSL lines, at step 304. The set of DSL lines having degraded performance characteristics may be determined based on historical performance data that is accessible to the computer-based system, as shown at step 304. For example, historical DSL performance data 106 may be evaluated by the DSL selection logic 104 within the DSL control system 102, with respect to a set of DSL lines supported by DSLAM 104.

A plurality of line profiles is then retrieved from a profile database, at step 306, and a performance parameter for each of the DSL lines is then measured, at step 308. A subset of DSL lines that have suitable performance based on the measured performance parameter are then removed from the set of degraded DSL lines, at step 310. The result of this step is a revised and reduced size set of DSL lines that have confirmed degraded performance, also shown at step 310. A line profile is then applied to each of the physical DSL lines that are identified by the revised set of DSL lines, at step 312. For example, a reduced speed profile or an interleaved profile would be applied to each of the physical DSL lines that are identified by the revised set of DSL lines, at step 312. Data associated with the revised set of DSL lines is then stored, at 314. An example of such data would be performance data measured after application of the new line profile to the DSL lines. The stored data is then reported, such as by using a remote interne browsing tool, at step 316. At step 318, an error message is reported if application of the profile to a physical DSL line fails. For example, where a new line profile is attempted to be applied to a physical DSL line and that new line profile is unable to be applied, an error message could be reported at the web-based reporting terminal 112. The error report provides for operator awareness and allows subsequent action to be taken by the operator.

The system and method illustrated with respect to FIGS. 1-3 above, discloses an automated system and may be used with many DSL lines and multiple DSLAM units in a deployed network. With this automated system, thousands of lines may be measured and adjusted automatically, including periodically or on a scheduled basis. With automated adjustments, human intervention is either not needed or, is significantly reduced. The processing time to measure and adjust each DSL line typically uses less than one minute of computer time. The same operation performed by a service technician manually, could take half an hour or longer, depending on the skill of the technician and the complexity of the DSL problem. In addition, using manual service technicians may result in one or more truck rolls adding further cost to DSL maintenance in the network.

The disclosed system utilizes automated methods and provides for improved DSL line performance. In addition, the system removes a significant level of human influence in the process and provides for enhanced performance at a lower cost. Further, line profile adjustment is often a difficult and error prone process and is well-suited to an automated computer control technique as shown.

In addition, with traditional manual methods, only those problem lines identified by customer calls would get attention. In the disclosed system, many problem lines are detected automatically and profiles may be automatically corrected to prevent these problem customer calls. Thus, customer service and DSL line performance is improved while maintenance costs are further reduced. In this manner, not only are customer complaints taken care of expeditiously, but many problems are fixed where neither the company nor the customer have been formally identified, thus, preventing potential subscriber losses. In addition, using a web-based reporting terminal, reports may be generated that include information, such as a list of problem lines selected, lines that fail in the adjustment process, lines that are adjusted successfully, and a line performance matrix that shows performance before and after the line profile has been applied. Thus, a useful reporting tool for network operators is also provided.

The above disclosed subject matter is to be considered illustrative, and not restrictive, and the appended claims are intended to cover all such modifications, enhancements, and other embodiments which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    identifying one or more second digital subscriber lines from one or more first digital subscriber lines based on historical performance data, wherein the one or more second digital subscriber lines are identified based on degraded performance that is determined using first performance information for the one or more first digital subscriber lines;
    applying a line profile to the one or more second digital subscriber lines;
    storing second performance information associated with the one or more second digital subscriber lines; and
    sending information to a remote computing device, the information associated with the one or more second digital subscriber lines.

2. The method of claim 1, further comprising receiving the historical performance data from a database.

3. The method of claim 1, further comprising receiving the first performance information from a digital subscriber line access multiplexor.

4. The method of claim 1, wherein the line profile is a reduced speed profile.

5. The method of claim 1, wherein the line profile is a channel interleaved profile.

6. The method of claim 1, wherein the one or more first digital subscriber lines are supported by a digital subscriber line access multiplexor.

7. The method of claim 1, further comprising receiving the second performance information from a digital subscriber line access multiplexor.

8. The method of claim 1, further comprising sending an error message to a computing device, the error message indicating an error associated with applying the line profile.

9. The method of claim 1, wherein the information indicates performance of the one or more second digital subscriber lines before the line profile is applied and after the line profile is applied to the one or more second digital subscriber lines.

10. The method of claim 1, wherein the information is based on the second performance information.

11. A system comprising:
a processor; and
a memory accessible to the processor, the memory including instructions that, when executed by the processor, cause the processor to perform operations comprising:
identifying one or more second digital subscriber lines from one or more first digital subscriber lines based on historical performance data, wherein the one or more second digital subscriber lines are identified based on degraded performance that is determined using first performance information for the one or more first digital subscriber lines;
applying a line profile to the one or more second digital subscriber lines;
storing second performance information associated with the one or more second digital subscriber lines; and
sending information to a remote computing device, the information associated with the one or more second digital subscriber lines.

12. The system of claim 11, wherein applying the line profile includes sending a request to a digital subscriber line access multiplexor.

13. The system of claim 11, wherein the operations further comprise receiving the second performance information from a digital subscriber line access multiplexor.

14. The system of claim 13, wherein the second performance information is determined after the line profile is applied to the one or more second digital subscriber lines.

15. The system of claim 11, wherein at least one of the one or more second digital subscriber lines encountered an error associated with an adjustment process.

16. A system comprising:
a processor; and
a memory accessible to the processor, the memory including instructions that, when executed by the processor, cause the processor to perform operations comprising:
sending first performance information associated with one or more first digital subscriber lines that are associated with reduced performance, the reduced performance determined based on historical performance data;
receiving information identifying one or more second digital subscriber lines that have degraded performance, the one or more second digital subscriber lines identified from the one or more first digital subscriber lines based on the first performance information;
applying one or more line profiles to the one or more second digital subscriber lines; and
determining second performance information for the one or more second digital subscriber lines.

17. The system of claim 16, wherein the processor and the memory are included in a digital subscriber line access multiplexor.

18. The system of claim 16, further comprising sending an error message to a computing device for a particular digital subscriber line of the one or more second digital subscriber lines when application of the one or more line profiles to the one or more second digital subscriber lines results in an error.

19. The system of claim 16, wherein applying the one or more line profiles causes a particular line profile associated with the one or more second digital subscriber lines to change to a reduced speed profile.

20. The system of claim 16, wherein applying the one or more line profiles causes a particular line profile associated with the one or more second digital subscriber lines to change to a channel interleaved profile.

* * * * *